United States Patent [19]

Hicks

[11] Patent Number: 5,690,395
[45] Date of Patent: Nov. 25, 1997

[54] SHOPPING CART WHEEL ASSEMBLY WITH ANTI-FRICTION BEARING AND FRICTION BEARING

[76] Inventor: Jimmy L. Hicks, 3315 Hollow Creek Rd., Arlington, Tex. 76017

[21] Appl. No.: 653,251

[22] Filed: May 24, 1996

[51] Int. Cl.$^6$ ............................................. B60B 27/00
[52] U.S. Cl. ..................... 301/105.1; 301/5.7; 384/624
[58] Field of Search .......................... 301/105.1, 64.7, 301/124.1; 384/624

[56] References Cited

U.S. PATENT DOCUMENTS

| | | | |
|---|---|---|---|
| 4,095,846 | 6/1978 | Agins | 301/37 R |
| 4,592,595 | 6/1986 | Freeman | 301/63 PW |
| 4,881,828 | 11/1989 | Kato | 384/127 |
| 4,938,610 | 7/1990 | Kato | 384/126 |
| 5,275,472 | 1/1994 | Hicks | 301/105.1 |
| 5,275,473 | 1/1994 | Hicks | 301/105.1 |
| 5,478,140 | 12/1995 | Racosky | 301/5.7 |

OTHER PUBLICATIONS

Boston Gear, North American Rockwell, pp. 832, 841, 843 1969.

*Primary Examiner*—David M. Mitchell
*Assistant Examiner*—Jonathan J. Yun
*Attorney, Agent, or Firm*—Edgar W. Averill, Jr.

[57] ABSTRACT

A shopping cart wheel assembly having an anti-friction or ball bearing portion and also having a journal bearing. Under severe side loads or conditions of wear, the journal bearing takes over and prevents the wheel from moving significantly out of alignment.

3 Claims, 3 Drawing Sheets

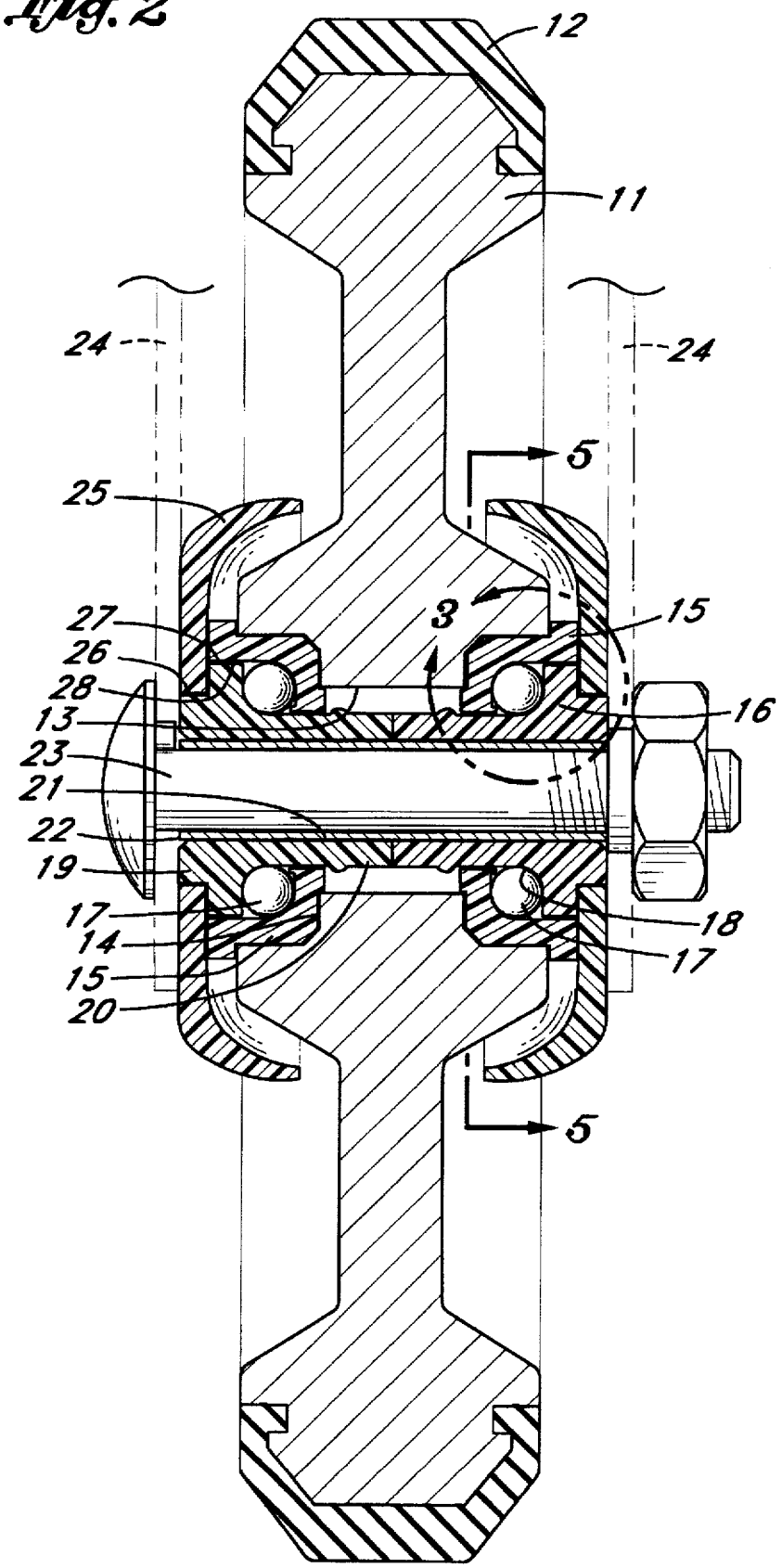

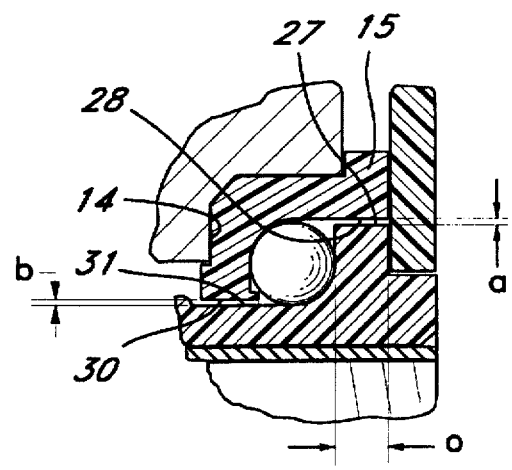
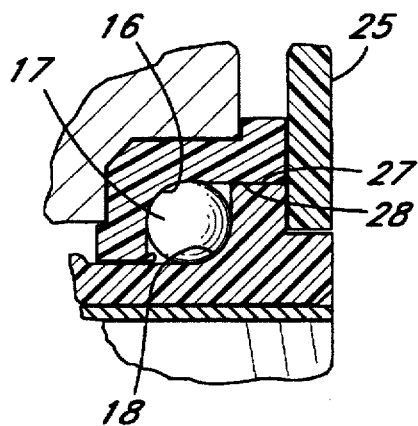
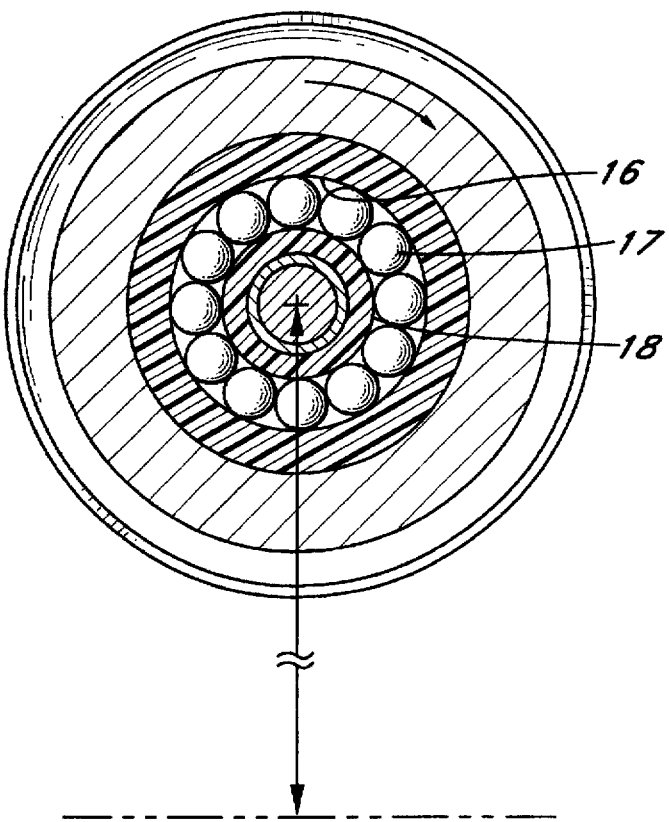

SHOPPING CART WHEEL ASSEMBLY WITH ANTI-FRICTION BEARING AND FRICTION BEARING

BACKGROUND OF THE INVENTION

The field of the invention is wheel assemblies and the invention relates more particularly to wheel assemblies of the type commonly used on shopping carts and other wheeled vehicles. A shopping cart wheel with a polymer bearing race is shown in applicant's U.S. Pat. No. 5,275,473 which has the significant advantage of eliminating steel inner and outer bearings races thereby eliminating the rusting of the wheel bearing races and reducing their tendency to become noisy during use. While polymeric bearing races cannot rust, they do have a tendency to wear with extended use. Such wear can proceed to the extent where the wheel can be capable of moving out of its normal axis of rotation and to cause a wobble as the cart is moved.

BRIEF SUMMARY OF THE INVENTION

It is an object of the present invention to provide a shopping cart wheel assembly which includes a backup journal type bearing to prevent the axis of rotation of the wheel from varying significantly from a new or unworn wheel.

The present invention is for a shopping wheel assembly of the type having a tread member supported peripherally about a hub. The hub has an axis of rotation and a pair of outwardly facing support cavities surrounding a central axially oriented opening. The outwardly facing bearing support cavities each hold a female bearing member supporting an outer bearing race contacted by a plurality of ball bearings. The ball bearings also contact a pair of inner bearing races supported on a male bearing race member. The present invention is an improvement which comprises a cylindrical journal positioned outwardly from each inner bearing race of each male bearing member. A cylindrical sleeve surrounds the cylindrical journal and is positioned outwardly from each outward bearing race of each female bearing member. The cylindrical journal and the cylindrical sleeve are axially located adjacent one another and spaced sufficiently apart so that when the wheel is under no load and the wheel bearing is not worn, the cylindrical journal and the cylindrical sleeve do not touch one another. The journal and sleeve, however, are spaced sufficiently close together so that when the wheel is under a very heavy load or is worn, the cylindrical journal and the cylindrical sleeve will contact one another. Preferably, the inner and outer bearings are fabricated from a polymer. Preferably, the cylindrical journal and the cylindrical sleeve are separated by about 0.01" in a new wheel under no load. Also preferably, the cylindrical journal and the cylindrical sleeve overlap about 0.125".

BRIEF DESCRIPTION OF THE DRAWINGS

FIG. 2 is a cross-sectional view of the shopping cart wheel assembly of FIG. 1.

FIG. 3 is an enlarged view taken along line 3—3 of FIG. 2.

FIG. 4 is a cross-sectional view analogous to FIG. 3 but showing the bearing under a heavy load or worn condition.

FIG. 5 is a cross-sectional view taken along line 5—5 of FIG. 2.

DESCRIPTION OF THE PREFERRED EMBODIMENTS

Figure 1:
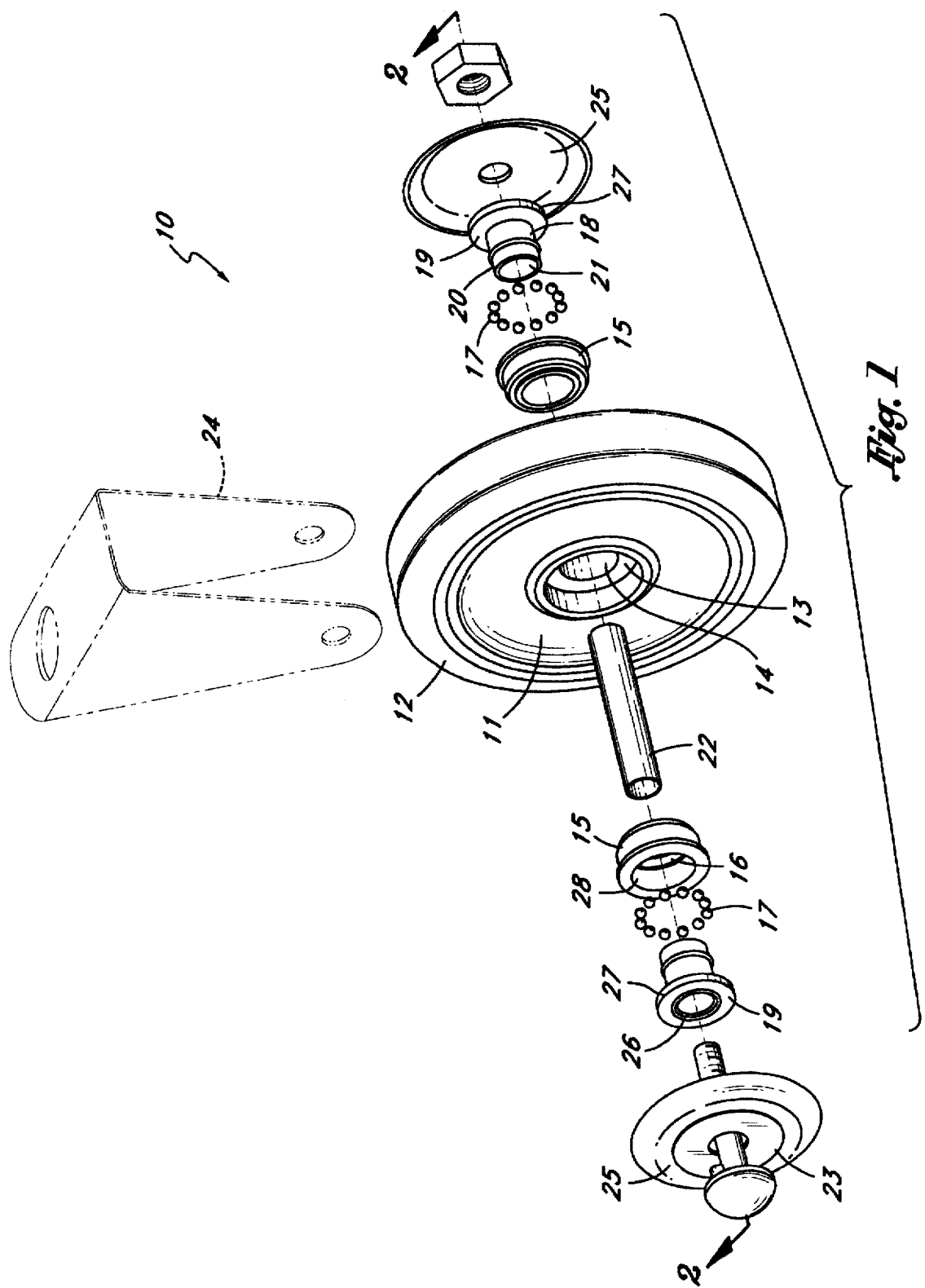
FIG. 1 is an exploded perspective view of the shopping cart wheel assembly of the present invention.

The shopping cart wheel assembly of the present invention is shown in exploded perspective view in FIG. 1 and indicated generally by reference character 10. Wheel assembly 10 has a hub 11 about which a tread member 12 is cast or otherwise supported. Hub 11 has a central opening 13 and has a pair of outwardly facing bearing support cavities 14. A pair of female bearing members 15 are supported by the outwardly facing bearing support cavities 14. Each female bearing member 15 has an outer bearing race 16 integrally formed therein and an inner sleeve 30 extending inwardly radially from the outer bearing race. The female bearing race member is preferably fabricated from a polymer such as an acetal polymer. The polymer should be such that it has a low coefficient of friction as well as excellent wear characteristics and relatively high hardness. Conventional steel ball bearings 17 ride along the outer bearing race 16 as well as the inner bearing race 18 of male bearing race member 19. Male bearing race member 19 preferably has an integral sleeve 20 which has a central opening 21 which fits snugly on metal sleeve 22. Metal sleeve 22 supports the axle 23 which may be bolted or riveted to a yoke 24 shown in phantom view in FIG. 1. A pair of thread guards 25 are held on thread guard holding rings 26 of male bearing race members 19.

Each of the male bearing race members 19 has a cylindrical journal 27 which fits within a pair of cylindrical sleeves 28 on the inner surface of female bearing members 15.

Each male bearing race member also includes an inner journal 31 which extends inwardly axially from the male bearing race.

An assembled wheel is shown in cross-sectional view in FIG. 2 and the parts on the right hand portion of the wheel assembly are essentially identical to those on the left hand side and thus, have been given the same reference characters.

The unique feature of the wheel of the present invention is the presence of an anti-friction type of bearing, namely the ball bearing assembly with its inner and outer race combined with a "journal" style of bearing consisting of journal 27 and sleeve 28. As the wheel is under substantial load both types of bearings work together and the journal bearing is capable of supporting a very substantial load and removing part of the load from the ball bearing assembly. The overlap of the journal bearing 27 and the sleeve 28 is indicated by reference character "o" in FIG. 3 and is typically about 0.125". When the wheel assembly is operated under no load or normal load the anti-friction ball bearing assembly carries the entire load of the wheel. Spaces indicated by reference characters "a" and "b" in FIG. 3 exists so that the journal bearing is not in use. The separation "a" should be about 0.010" however as the bearing assembly wears or is under heavy side loads or very heavy downward loads the journal bearing comes into play as shown in FIG. 4 where the cylindrical journal 27 contacts the cylindrical sleeve 28 and prevents undue pressure on the inner race 18 and the outer bearing race 16. The assembled shopping cart wheel assembly as shown in cross-sectional view in FIG. 5 where the contact between ball bearings 17 and the polymeric outer bearing race 16 and polymeric inner bearing race 18 is shown.

The result is a shopping cart wheel assembly which has substantial additional protection against wheel wobble. The journal bearing is initially lubricated but even if the lubrication is removed by washing, the friction between the polymeric members is relatively low. The male bearing race member 19 and thus, the cylindrical journal 27 is preferably fabricated from an impact resistant polymer such as nylon which also provides a very low co-efficient of friction with the sleeve.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A shopping cart wheel assembly having a hub supporting a tire portion, said hub having an axial opening surrounding an axle assembly and having a pair of outwardly facing outer bearing support cavities, each of said pair of outwardly facing outer bearing support cavities supporting a bearing assembly comprising:

an outer bearing race member (15), said outer bearing race member (15) being held by said outer bearing support cavity (14), and having a curved ball bearing outer race surface (16) extending inwardly radially from said outer race surface to form an inner sleeve (30) and extending outwardly axially to form an outer sleeve (28);

an inner bearing race member (19), said inner bearing race member (19) being held by said axle assembly (22,23), and having a curved ball bearing inner race surface (18) extending outwardly radially and outwardly axially from said inner race surface (18) to form an outer journal bearing surface (27) spaced an outer gap (a) distance from said outer sleeve and extending inwardly from said inner race surface (18) to form an inner journal (31) spaced an inner gap distance (b) from said inner sleeve (30) and as said race surfaces (16,18) wear, said outer sleeve (28) will contact said outer journal bearing surface (27) to form a journal bearing and upon further wear, said inner sleeve (30) will contact said inner journal bearing surface (31) to form an additional journal bearing; and a plurality of ball bearings positioned between said inner and outer race surfaces.

2. The shopping cart wheel assembly of claim 1 wherein the cylindrical journal and cylindrical sleeve are separated about 0.01 inches in a new wheel under no load.

3. The shopping cart wheel assembly of claim 1 wherein the cylindrical journal and cylindrical sleeve overlap about 0.125 of an inch.

* * * * *